United States Patent
Lee et al.

(10) Patent No.: US 9,214,993 B2
(45) Date of Patent: Dec. 15, 2015

(54) METHOD AND APPARATUS FOR TRANSMITTING AND RECEIVING CHANNEL RELATED INFORMATION

(71) Applicants: Samsung Electronics Co., Ltd., Gyeonggi-do (KR); INDUSTRY-ACADEMIC COOPERATION FOUNDATION, YONSEI UNIVERSITY, Seoul (KR)

(72) Inventors: Hyojin Lee, Gyeonggi-do (KR); Chungyong Lee, Seoul (KR); Hoondong Nho, Gyeonggi-do (KR); Younsun Kim, Gyeonggi-do (KR); Juho Lee, Gyeonggi-do (KR); Hyoungju Ji, Seoul (KR); Sangwon Park, Seoul (KR); Ilgyu Choi, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 14/201,600

(22) Filed: Mar. 7, 2014

(65) Prior Publication Data
US 2014/0254702 A1    Sep. 11, 2014

(30) Foreign Application Priority Data

Mar. 7, 2013    (KR) ........................ 10-2013-0024626

(51) Int. Cl.
*H04B 7/02* (2006.01)
*H04B 7/04* (2006.01)
*H04B 7/06* (2006.01)

(52) U.S. Cl.
CPC ............ *H04B 7/0456* (2013.01); *H04B 7/0617* (2013.01); *H04B 7/0619* (2013.01); *H04B 7/0639* (2013.01); *H04B 7/0658* (2013.01)

(58) Field of Classification Search
CPC .... H04B 7/0639; H04B 7/0417; H04B 7/024; H04B 7/0452; H04B 7/0456; H04B 7/0632; H04B 7/0626; H04B 7/0482; H04B 7/0619; H04L 1/0026; H04L 1/0029; H04L 25/03898
USPC .......... 375/267, 260, 346, 316; 370/252, 437; 455/450
See application file for complete search history.

(56) References Cited

U.S. PATENT DOCUMENTS

| | | | |
|---|---|---|---|
| 2008/0008258 A1* | 1/2008 | Tanabe .......................... | 375/267 |
| 2008/0219376 A1* | 9/2008 | Qi et al. ........................ | 375/285 |
| 2011/0044186 A1* | 2/2011 | Jung et al. ..................... | 370/252 |
| 2011/0069773 A1* | 3/2011 | Doron et al. .................. | 375/267 |
| 2013/0044610 A1* | 2/2013 | Zhao et al. .................... | 370/252 |
| 2013/0273954 A1* | 10/2013 | Ji et al. .......................... | 455/509 |

* cited by examiner

*Primary Examiner* — Leila Malek

(57) ABSTRACT

The present disclosure relates to a method and an apparatus for transmitting and receiving channel related information. A method of transmitting channel related information of a UE according to an embodiment of the present disclosure includes configuring a sub-channel corresponding to a part of a plurality of antennas of an eNB; acquiring a Channel Estimation Error (CEE) and a Precoding Matrix Indicator (PMI) corresponding to the sub-channel; and transmitting a Sub-channel Indicator (SI) indicating the sub-channel, according to the CEE and the PMI. In accordance with an embodiment of the present disclosure, the channel related information is efficiently transmitted and received in a system in which a plurality of antennas is used.

10 Claims, 11 Drawing Sheets

FIG. 6

$$h_k = \left[ \overbrace{h_1, h_2, h_3, \ldots, h_{M_T}}^{h_k^{(2)} \to \{0.2, w_2^{(3)}\}} \right]$$

$h_k^{(1)} \to \{\underbrace{0.1}_{CEE}, \underbrace{w_3^{(3)}}_{PMI}\}$ CEE AND PMI MEASURED BY UE

FIG. 8

$$h_k = \left[ \overbrace{h_1, h_2, h_3, \ldots, h_{M_T}}^{h_k^{(2)} \to \{0.2, w_2\} \stackrel{CEE_{th}=0.15}{\to} \{0, w_2\}} \right]$$

$$h_k^{(1)} \to \{0.1, w_3\} \stackrel{CEE_{th}=0.15}{\to} \{1, w_3\}$$

METHOD AND APPARATUS FOR TRANSMITTING AND RECEIVING CHANNEL RELATED INFORMATION

CROSS-REFERENCE TO RELATED APPLICATION(S) AND CLAIM OF PRIORITY

The present application is related to and claims the benefit under 35 U.S.C. §119(a) of a Korean patent application filed on Mar. 7, 2013 in the Korean Intellectual Property Office and assigned Serial No. 10-2013-0024626, the entire disclosure of which is hereby incorporated by reference.

TECHNICAL FIELD

The present disclosure relates to a method and an apparatus for transmitting and receiving channel related information, and more particularly, to a method and an apparatus for transmitting and receiving channel related information relating to a device using a plurality of antennas.

BACKGROUND

A massive Multiple Input Multiple Output (MIMO) system corresponds to a system for improving throughput by installing a plurality of antennas in an eNB. According to the massive MIMO system, a high data rate used in a next-generation communication system subsequent to $4^{th}$ generation may be easily satisfied by only a simple linear precoder. In theory, in a case of using a large number of antennas, various problems which limit throughput of the system, such as fast fading, inter-user interference, and the like may be perfectly removed by using the linear precoder. That is, when a multiple user system based on the massive MIMO is configured, throughput of this system, which is much higher than that of an existing communication system, may be obtained by low costs.

Such an advantage of the massive MIMO system is based on assumption that the eNB knows channel information. However, in a situation where there are a large number of antennas, such an assumption is very burdensome to the system. Thus, researches on an existing massive MIMO system are performed based on a Time-Division Duplex (TDD) system in which channel estimation costs are not affected by the number of antennas of the eNB mainly due to channel reciprocity.

When data transmission amounts of UpLink (UL) and DownLink (DL) are similar to each other or a distance between a transmission end and a reception end is large, the TDD system has a frequency efficiency lower than that of a Frequency-Division Duplex (FDD) system due to conversion between a transmission mode and a reception mode. Accordingly, an existing communication system such as a Universal Mobile Telecommunications System (UMTS), Wideband Code Division Multiple Access (WCDMA), Code Division Multiple Access 2000 (CDMA2000), and the like has supported the FDD mode in various environments. Thus, researches and development on a FDD massive MIMO system for securing backward compatibility are a necessary and sufficient condition which allows the massive MIMO system to be a core technology of the next-generation communication system.

In the FDD system, channel correlation is not established. Thus, the FDD system uses a limited feedback system which quantizes a channel estimated by the reception end and transmits the quantized channel to the transmission end, in order to secure Channel State Information at the Transmitter (CSIT).

Existing researches on the limited feedback show that a size of a codebook for restraining system throughput deterioration caused by the limited feedback in a single stream (or Single User (SU)) environment exponentially increases according to the number of transmission antennas. A size of a codebook needed when an environment of the system is expanded to a multiple stream (or Multiple User; MU) environment also increases according to a Signal-to-Noise Ratio (SNR) as well as the number of transmission antennas. These facts suggest that the number of pilot signals, feedback channel capacity, and the size of the codebook, and the like will become main factors which restrain throughput of the FDD massive MIMO system. Especially, in the FDD massive MIMO system, the UL may obtain a high array gain based on channel estimation, such that it is likely that a cause of a bottleneck of the system is the size of the codebook rather than the feedback channel capacity.

FIG. 1 illustrates a configuration of a wireless communication system. Referring to FIG. 1, in an FDD communication system according to the related art, in order to estimate a channel at a transmission end, reception ends User 1 to User K quantize an estimated channel by using a Channel Quality Indicator (CQI) and a Precoding Matrix Indicator (PMI) and then feedback indexes obtained by the quantization to a transmission end. The transmission end determines a coding technique and a modulation order based on the received CQI, determines a proper precoder based on the received PMI, and transmits a signal according to the determined content. The PMI among information fed back to the transmission end includes information on a direction of each channel, various codebook generation algorithms such as a Grassmannian codebook, a Discrete Fourier Transform (DFT) codebook, and the like are proposed in order to minimize a Channel Estimation Error (CEE) caused by the PMI quantization.

It is assumed that B feedback bits are allocated for the PMI and a codebook having a size of N=2B is used. A case (perfect CSIT) CCSIT(P) where the transmission end perfectly knows the channel when a SU having a single antenna is serviced by using a Matched Filter (MF) and capacity throughput of CFB (P) when the transmission end estimates the channel by using the limited feedback system according to the related art are expressed by Equation (1) and Equation (2).

$$C_{CSIT}(P) = E_h\{\log_2(1+P\|h\|^2)\} \quad (1)$$

$$C_{FB}(P) = E_{h,w}\{\log_2(1+P\|h\|^2\cos^2(\angle(h,w)))\} \geq E_h\{\log_2(1+P\|h\|^2(1-2^{-B/(M-1)}))\} \quad (2)$$

Here, P denotes a power of a transmission signal, and variance of noise is assumed to be 1. Equation (1) and Equation (2) imply that SNR loss caused by the limited feedback in a single stream or SU situation is a value corresponding to −10 $\log_{10}(1-2^{-B/(M-1)})$dB as compared with perfect CSIT. That is, when B is equal to $M_T-1$, a constant throughput loss as compared with the perfect CSIT may be maintained through the limited feedback system regardless of the SNR. When multiple streams or MUs are serviced based on a Zero-Forcing (ZF) filter, a difference between capacity throughputs of the perfect CSIT and the limited feedback system is expressed by Equation (3).

$$\Delta C(P) = C_{CSIT}(P) - C_{FB}(P) = M_T \log_2(1+P\cdot 2^{-B/(M_T-1)}) \quad (3)$$

Referring to Equation (3), when multiple streams are transmitted in the limited feedback system according to the related art, the size of the codebook needed for entirely securing a throughput gain according to an increase in the SNR may also increase according to the SNR as well as the number of transmission antennas.

FIG. 2A is a graph depicting a relation between the SNR and the data rate according to the CSIT, in a single user environment.

FIG. 2B is a graph depicting a relation between the SNR and the data rate according to the CSIT, in an MU environment.

As can be seen with reference to FIGS. 2A and 2B, when the multiple streams are transmitted, in a case where the size B of the codebook is fixed, there remains inter-UE interference even when the SNR increases, such that the throughput converges to a specific value. This implies that it may be impossible to efficiently remove interference through the linear precoder in the massive MIMO system when the limited feedback according to the related art is applied. Due to this characteristic, even when the SNRs of User Equipment (UEs) are excellent, there are disadvantages in that probability to be operated in an SU mode increases and a cell yield rate decreases.

SUMMARY

To address the above-discussed deficiencies, it is a primary object to efficiently improve communication throughput in an MU environment.

In order to solve the aforementioned problems, a method of transmitting channel related information of a UE according to an embodiment of the present disclosure includes configuring a sub-channel corresponding to a part of a plurality of antennas of an eNB; acquiring a CEE and a PMI corresponding to the sub-channel; and transmitting an SI indicating the sub-channel, according to the CEE and the PMI.

In order to solve the aforementioned problems, a method of receiving channel related information of an eNB according to an embodiment of the present disclosure includes receiving an SI corresponding to a part of a plurality of antennas of the eNB; and performing scheduling by using the received SI.

In order to solve the aforementioned problems, a UE for transmitting channel related information according to an embodiment of the present disclosure includes a controller that configures a sub-channel corresponding to a part of a plurality of antennas of an eNB, and acquires a CEE and a PMI which correspond to the sub-channel; and a communication unit that transmits an SI indicating the sub-channel, according to the CEE and the PMI.

In order to solve the aforementioned problems, an eNB of receiving channel related information according to an embodiment of the present disclosure includes a communication unit that receives an SI corresponding to a part of a plurality of antennas of the eNB; and a controller that performs scheduling by using the received SI.

In accordance with an embodiment of the present disclosure, the present disclosure may efficiently improve communication throughput in an MU environment.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a scheme by which a kth UE determines a CEE for each sub-channel and an optimal PMI when m is equal to 3;

FIG. 8 illustrates a scheme by which a kth UE determines a CEE for each sub-channel and an optimal PMI when m is equal to 2;

DETAILED DESCRIPTION

Figure 1:
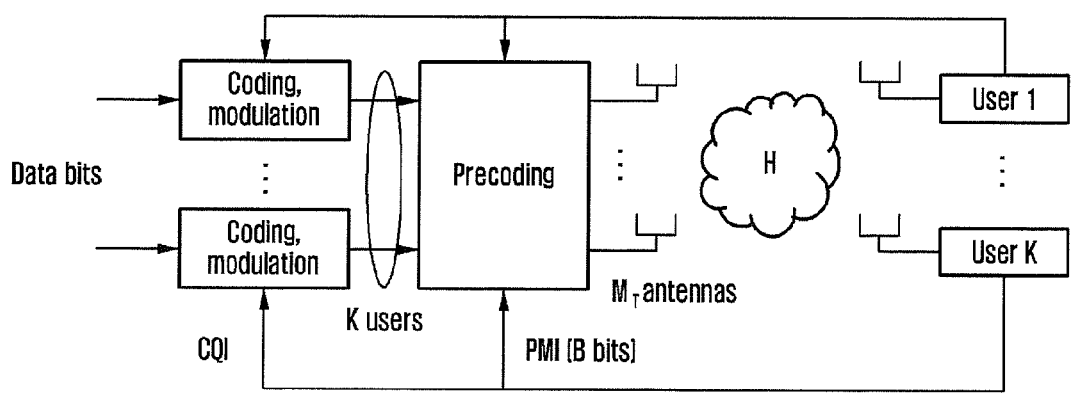
FIG. 1 illustrates a configuration of a wireless communication system.
Figure 2A:
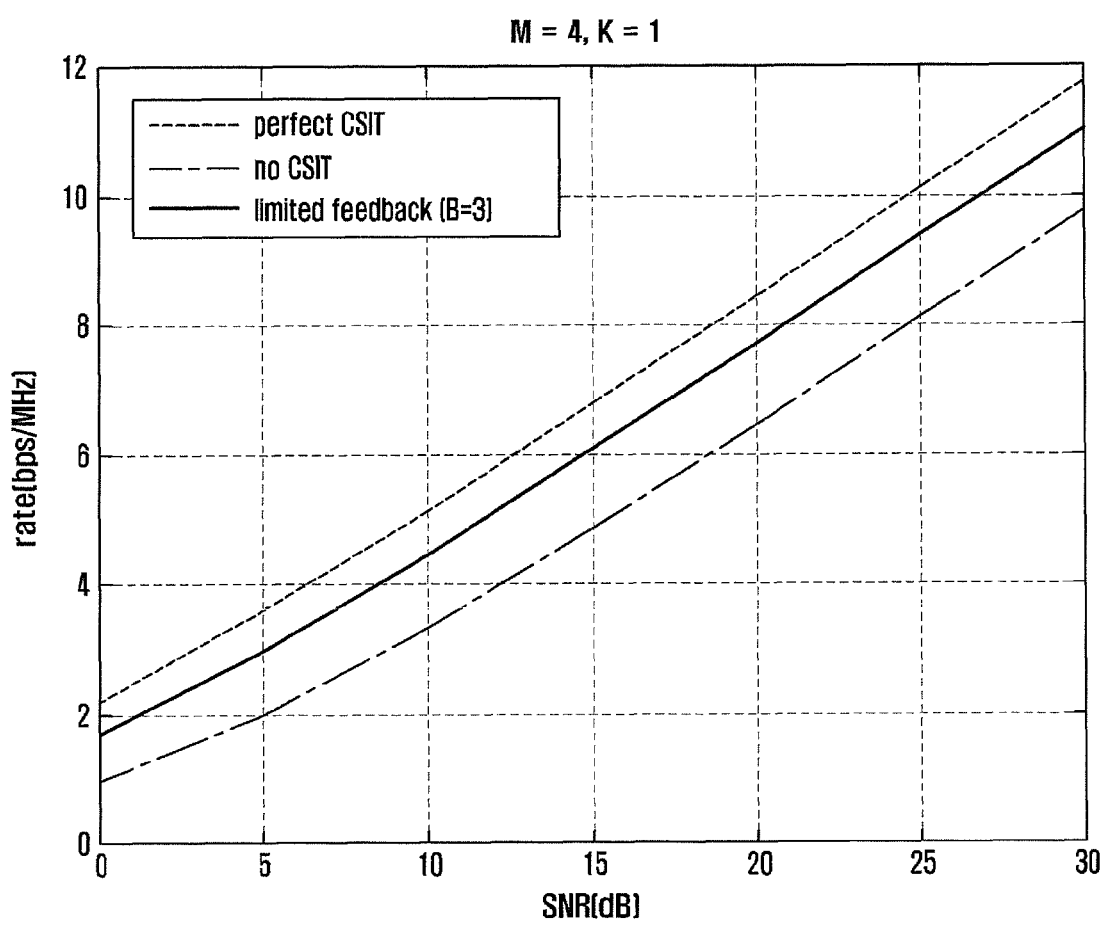
FIG. 2A illustrates a graph depicting a relation between the SNR and the data rate according to the CSIT, in a single user environment.
Figure 2B:
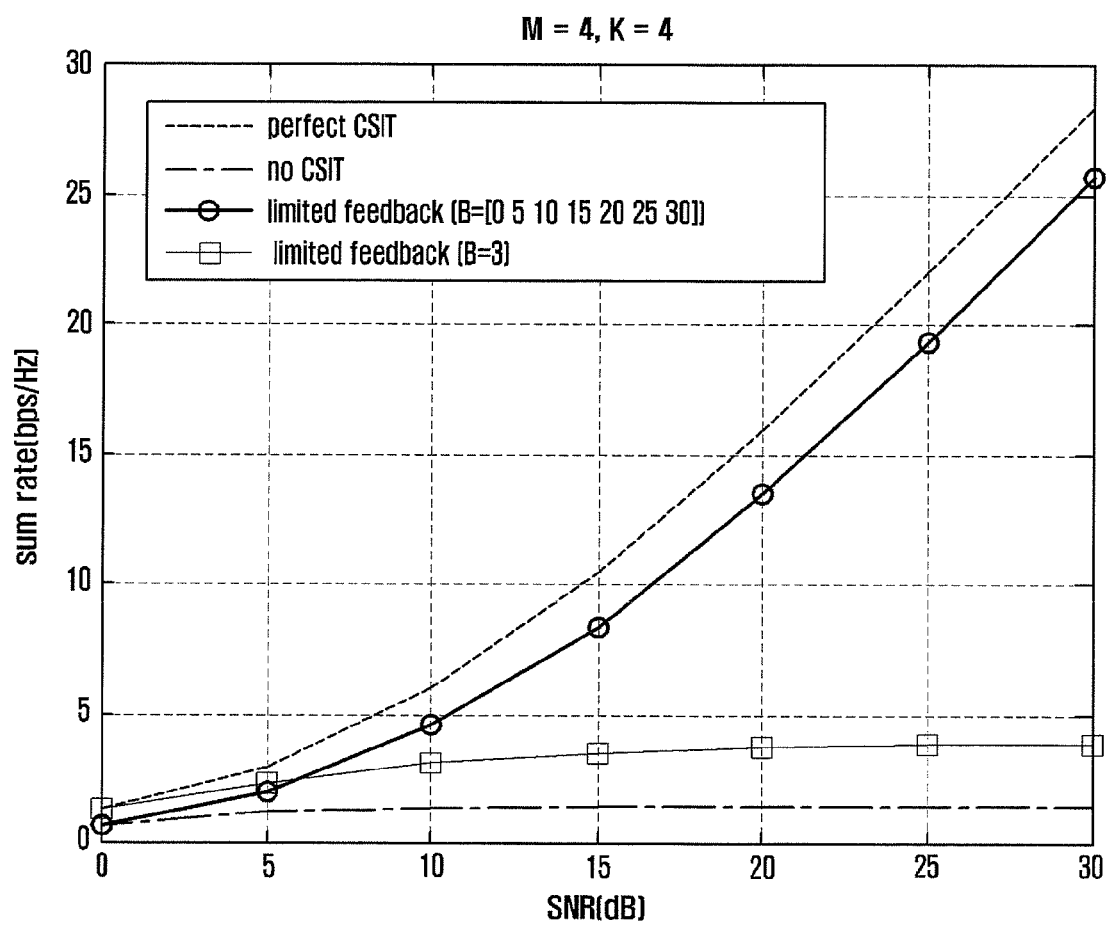
FIG. 2B illustrates a graph depicting a relation between the SNR and the data rate according to the CSIT, in an MU environment.

FIGS. 3 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Hereinafter, embodiments of the present disclosure will be described in detail with reference to the accompanying drawings.

In describing the example embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

An aspect of some embodiments of the present disclosure is to secure backward compatibility for an FDD UE and to improve cell throughput at the same time, by increasing probability to be operated in an MU mode in an FDD massive MIMO system of which channel estimation of a transmission end is very limited.

Especially, an aspect of some embodiments of the present disclosure is to improve interference nulling efficiency by converting a gain caused by a size of an array of massive MIMO into improvement of channel estimation accuracy.

Another aspect of the present disclosure is to propose a limited feedback system which may provide a multiple stream service in an FDD mode with high channel estimation accuracy even when a limited codebook is used, by efficiently using a space resource of the massive MIMO system.

In order to describe an operation according to an embodiment of the present disclosure, a situation where an eNB has 3 antennas, 2 UEs have a single antenna each, and the eNB and the UE share a codebook, of which a size is 3, with each other is assumed. Herein, MT denotes the number of antennas which the eNB has, K denotes the number of UEs having a single antenna, and N denotes the size of the codebook. This assumption is made to easily understand an operation description, and may be directly expanded to a massive MIMO environment.

The eNB transmits $M_T$ Reference Signals (RSs) such that each of UEs may perform channel estimation. A channel $h_k$ estimated by a $k^{th}$ UE is expressed by Equation (4).

$$h_k = [h_{k,1}, h_{k,2}, \ldots, h_{k,M_T}] \quad (4)$$

Where, $h_{k,i}$ denotes an estimation channel factor between a $k^{th}$ UE and an $i^{th}$ antenna.

In the limited feedback system according to the related art, the UE estimates $h_k$, then estimates correlation $$v = \max_{w_n^{(M_T)} \in W} |h_k w_n^{(M_T)}| / \|h_k\|$$

between codebook vectors, and then feeds back corresponding index $\hat{n}_k$ defined by Equation (5) to the eNB.

$$\hat{n}_k = \arg \min_{w_n^{(M_T)} \in W} \{CEE_k\} \quad (5)$$

Where $W^{(M_T)} = [w_1^{(M_T)}, \ldots, w_N^{(M_T)}]$ is a $M_T \times N$ codebook and $w_n^{(M_T)} = [w_{1,n}, \ldots, w_{M_T,n}]^T$ is a $M_T \times 1$ codebook vector, $CEE_k$ is equal to $1-v^*v$ and denotes a CEE of a $k^{th}$ UE.

Figure 3:
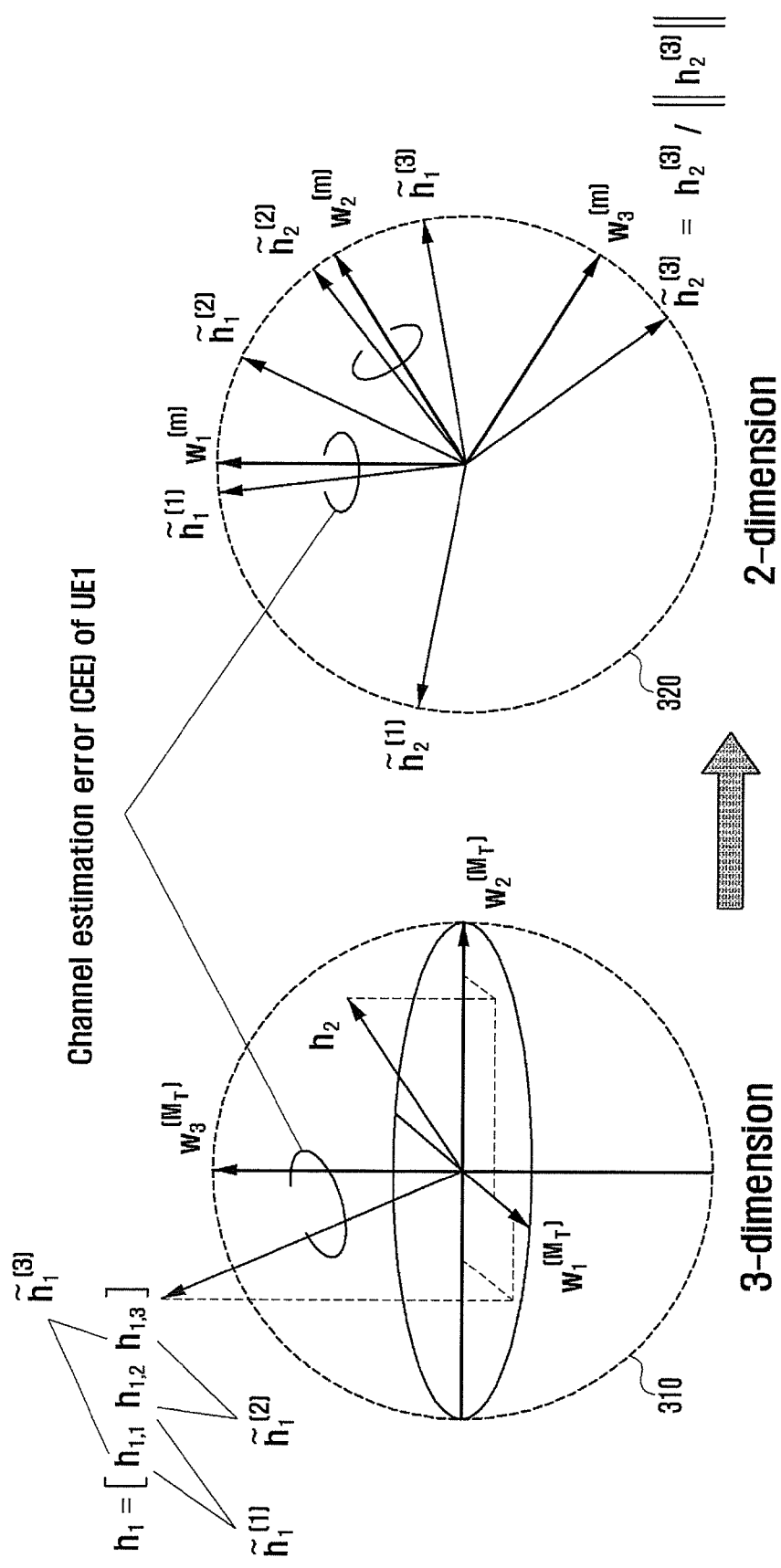
FIG. 3 illustrates generation of a sub-channel according to an embodiment of the present disclosure.

FIG. 3 illustrates generation of a sub-channel according to an embodiment of the present disclosure.

When an estimation channel h1 of a first UE and an estimation channel h2 of a second UE are expressed as illustrated in a 3-dimensional sphere 310, the eNB may acquire the CSIT by information fed back by each UE according to Equation (6).

$$\hat{H} = [w_3^{(M_T)} w_2^{(M_T)}]^T = \begin{bmatrix} w_{1,3} & w_{2,3} & w_{3,3} \\ w_{1,2} & w_{2,2} & w_{3,2} \end{bmatrix} \quad (6)$$

In this embodiment, as illustrated in the 3-dimensional sphere 310, three codebook vectors represent two channel directions within the 3-dimensional sphere 310, such that it is likely that channel estimation accuracy deteriorates and the CEE of each of the UEs has a large value.

In accordance with the present embodiment, the UE performs channel estimation for a sub-channel by using a converted codebook having a dimension lower than $M_T$. When a size of the sub-channel (the number of estimation channel factors/the number of antennas) is equal to m, each of the UEs may generate S sub-channels, wherein S is equal to $M_T C_m$. In the present embodiment, when m is equal to 2, 3 sub-channels are generated for each of the UEs, and a sub-channel of the first UE is expressed by Equation (7).

$$h_1^{(1)} = [h_{1,1}, h_{1,2}], h_1^{(2)} = [h_{1,2}, h_{1,3}], h_1^{(3)} = [h_{1,1}, h_{1,3}] \quad (7)$$

In an embodiment, $h_k^{(s)}$ denotes a $s^{th}$ sub-channel of a $k^{th}$ UE, wherein $s \in \{1, \ldots, S\}$. In accordance with the present embodiment, since one sub-channel having the smallest CEE among three sub-channels is represented in a 2-dimensional sphere 320 by three codebook vectors even when a codebook of which N is equal to 3 is used according to the conventional technique, a probability to decrease the CEE of each of the UEs as compared with the conventional technique may increase. The increased probability may be a gain caused by performing estimation by magnifying a part of all the channels by using a codebook of which the dimension is lower than the number of transmission antennas.

The detailed operation sequence of the present disclosure will be described as follows. According to the conventional technique, first, the eNB facilitates channel estimation for each of the UEs by transmitting $M_T$ RSs. Each of the UEs estimates all the channels, then measures a sub-channel and correlation $$v = \max_{w_n^{(m)} \in W^{(m)}} |h_k^{(s)} w_n^{(m)}| / \|h_k^{(s)}\|$$

for a codebook, and then feeds back an optimal sub-channel and codebook information calculated by Equation (R) to the eNB.

$$[\hat{s}_k, \hat{n}_k] = \arg \min_{s \in S, w_n^{(m)} \in W^{(m)}} \{CEE_k\} \quad (8)$$

Where $\hat{S}_k$ denotes an optimal Sub-channel Indicator (SI) of a $k^{th}$ UE, and $\hat{n}_k$ denotes a PMI of the $k^{th}$ UE. S is equal to $\{1, \ldots, S\}$, $w^{(m)}$ is a m×N codebook, and $CEE_k$ is a channel estimation error when the kth UE matches a $\hat{S}_k^{th}$ sub-channel and a $\hat{n}_k^{th}$ codebook. In a case of 2-dimensional sphere 320, the first UE feeds back $[\hat{s}_1, \hat{n}_1 = 1]$ to the eNB, and the second UE feeds back $[\hat{s}_2 = 2, \hat{n}_2 = 2]$ to the eNB. In this embodiment, CSIT estimated by the eNB is expressed by Equation (9).

$$\hat{H} = \begin{bmatrix} w_1^{(2)} & 0 \\ 0 & w_2^{(2)} \end{bmatrix}^T = \begin{bmatrix} w_{1,1} & w_{2,1} & 0 \\ 0 & w_{1,2} & w_{1,2} \end{bmatrix} \quad (9)$$

The eNB calculates a proper precoder based on the estimated $\hat{H}$, and then transmits a signal to the UE. When a filter using an interference cancellation scheme, such as the ZF filter or a Minimum Mean Square Error (MMSE) filter, is used in the proposed technique, sub-channel indexes of the UEs are needed to be matched with each other in order to efficiently cancel interference. That is, a condition where $\hat{S}_1 = \ldots = \hat{S}_k$ should be able to be satisfied through proper cooperation between the eNB and the UE, and the present specification proposes various ways for the satisfaction of the condition through various embodiments.

A main aspect of some embodiments of the present disclosure is to improve channel estimation accuracy by selecting and using a sub-channel matching with a codebook which the eNB and the UE share with each other and has a limited size, among all the channels. The present disclosure may obtain the following effects by trading off an array size of the antenna and the channel estimation accuracy.

An embodiment of this disclosure provides expansion of an area which can be operated in an MU mode.

A codebook which the conventional LTE and the LTE-Advanced (LTE-A) supports has a very poor channel estimation performance, such that the codebook operates in the MU mode very restrictively. The space resource of the massive MIMO is converted into the channel estimation accuracy through an embodiment of the present disclosure, such that a probability that the system operates in the MU mode increases and cell performance increases largely.

An embodiment of this disclosure provides a solution for generating a high dimensional codebook.

In accordance with an embodiment of the present disclosure, the UE performs selective channel estimation by using a sub-channel, such that, when the number of the sub-channels to be used is set to be sufficiently small, the system may operate by using a codebook registered in the conventional standard and having a dimension lower than 8. Further, there is an advantage in that the size of the codebook is not needed to be forcedly expanded when there are sufficiently many antennas.

An embodiment of this disclosure provides a configuration of the sub-channel and a method of feeding back the SI.

Before performing channel magnifying, the eNB and the UE should determine a configuration of the sub-channel and a method of sharing an index. The UE determines a sub-channel for performing the channel magnifying, and feeds back the SI to the eNB in order to notify the eNB of the determined sub-channel. The SI may be configured by the index $\hat{S}_k$ of the sub-channel, or may be configured by a combination of the indexes of the eNB antennas constituting the sub-channel. Equation (10) and Equation (11) are two kinds of constituent examples of the SI.

$$\hat{S}_k \in \{1, \ldots, S\} \quad (10)$$

$$\hat{S}_k = [S_{k,1}, S_{k,2}, \ldots, S_{k,m}], \text{for } S_{k,i} \in \{1, \ldots, M_T\} \quad (11)$$

The sub-channels indicated by the same SI use the same antenna. However, even when each of the UEs uses the same antenna, channel states of the UEs may be different from each other. Thus, the same SI used by each of the UEs indicates an aggregation of the same antennas but does not indicate the same sub-channel.

A configuration of the sub-channel for the channel magnifying may be performed in various methods according to the following detailed embodiments according to a situation of the eNB and the UE.

An embodiment of this disclosure provides an all configuration mode (mode 0).

Mode 0 (all configuration) is a method of estimating a channel by configuring a sub-channel for all possible cases. There are S0 sub-channels for each of the UEs. Although the method of this embodiment has optimal performance, a burden for the UE to search for an optimal sub-channel and an index of the codebook vector is large and an amount of data of feedback increases by log 2S0. Table 1 is an example of the all configuration of the SI and the sub-channel for mode 0 when MT is equal to 4 and m is equal to 2. The SI may be fed back in a form of SI 1 or SI 2 of Table 1 by Equation (10) or Equation (11) according to determination of the eNB.

TABLE 1

| SI 1 | SI 2 | $h_k^{(s)}$ |
|---|---|---|
| 1 | [1, 2] | $\{h_{k,1}, h_{k,2}\}$ |
| 2 | [1, 3] | $\{h_{k,1}, h_{k,3}\}$ |
| 3 | [1, 4] | $\{h_{k,1}, h_{k,4}\}$ |
| 4 | [2, 3] | $\{h_{k,2}, h_{k,3}\}$ |
| 5 | [2, 4] | $\{h_{k,2}, h_{k,4}\}$ |
| 6 | [3, 4] | $\{h_{k,3}, h_{k,4}\}$ |

Other embodiments provide sub-optimal configuration modes (modes 1 to 3).

Figure 4:
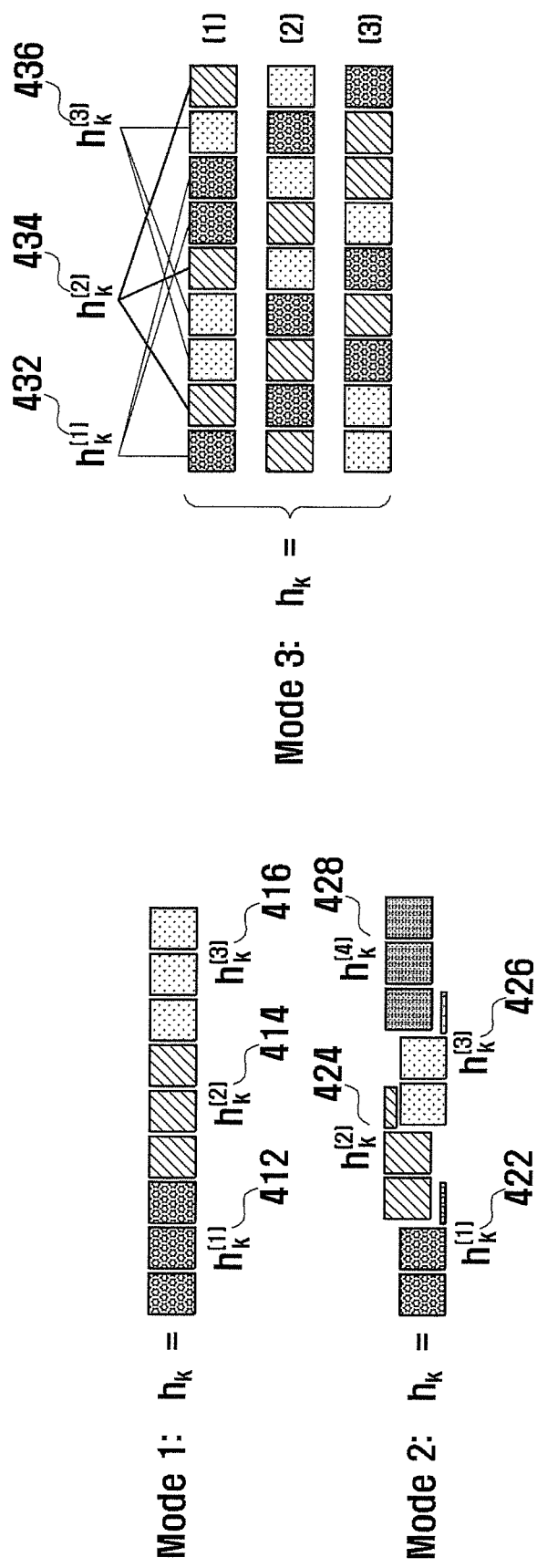
FIG. 4 illustrates a configuration of a sub-channel according to an embodiment of the present disclosure.

FIG. 4 illustrates a configuration of a sub-channel according to an embodiment of the present disclosure. In FIG. 4, each of rectangles indicates an estimation channel factor between a $k^{th}$ UE and each of antennas.

In accordance with the aforementioned mode 0, each of the UEs can always constitutes S0 sub-channels, such that it is difficult to rapidly perform handling according to a change of a situation. Thus, as illustrated in FIG. 4, it is possible to fluidly perform handling by using additional sub-channel configuration modes according to situations.

One embodiment (mode 1, an exclusive mode) is an exclusive sub-channel configuration method which does not allow overlapping between sub-channels. As can be seen with reference to FIG. 4, the sub-channels 412, 414 and 416 are configured not to overlap each other.

Another embodiment (mode 2, an overlapping mode) is a method of configuring sub-channels, which partially allows overlapping between sub-channels. This embodiment also corresponds to a sub-channel configuration method having a cyclic shift form. A first sub-channel 422 shares a part of channel factors with a second sub-channel 424. Likewise, the second sub-channel 424 shares a part of channel factors with a third sub-channel 426. The third sub-channel 426 shares a part of channel factors with a fourth sub-channel 428.

Yet another embodiment (mode 3; a random mode) is a sub-channel configuration method which changes a configuration of sub-channels to one pattern among several predetermined patterns according to a flow of time. At a first time period, the UE operates in a (1) pattern to configure and use three sub-channels 432, 434 and 436. At a second time period, the UE operates in a (2) pattern, and at a third time period, the UE operates in a (3) pattern. Each of the sub-channel patterns may be exclusively configured according to this embodiment or may be configured to overlap each other according to another embodiment. In accordance with a modified embodiment, a sub-channel configured by estimation channel factors randomly selected at every time period may be used instead of the predetermined patterns. In accordance with another modified embodiment, the sub-channel pattern to be used may be changed according to other events instead of the time period.

By using the proposed methods and combinations of the proposed methods, the number of the sub-channels to be measured may decrease and an amount of data for feedback may decrease. Further, performance deterioration caused by a decrease in the number of the sub-channels or performance deterioration caused by correlation between the antennas may be minimized by configuring the sub-channels in a proper form.

Figure 5:
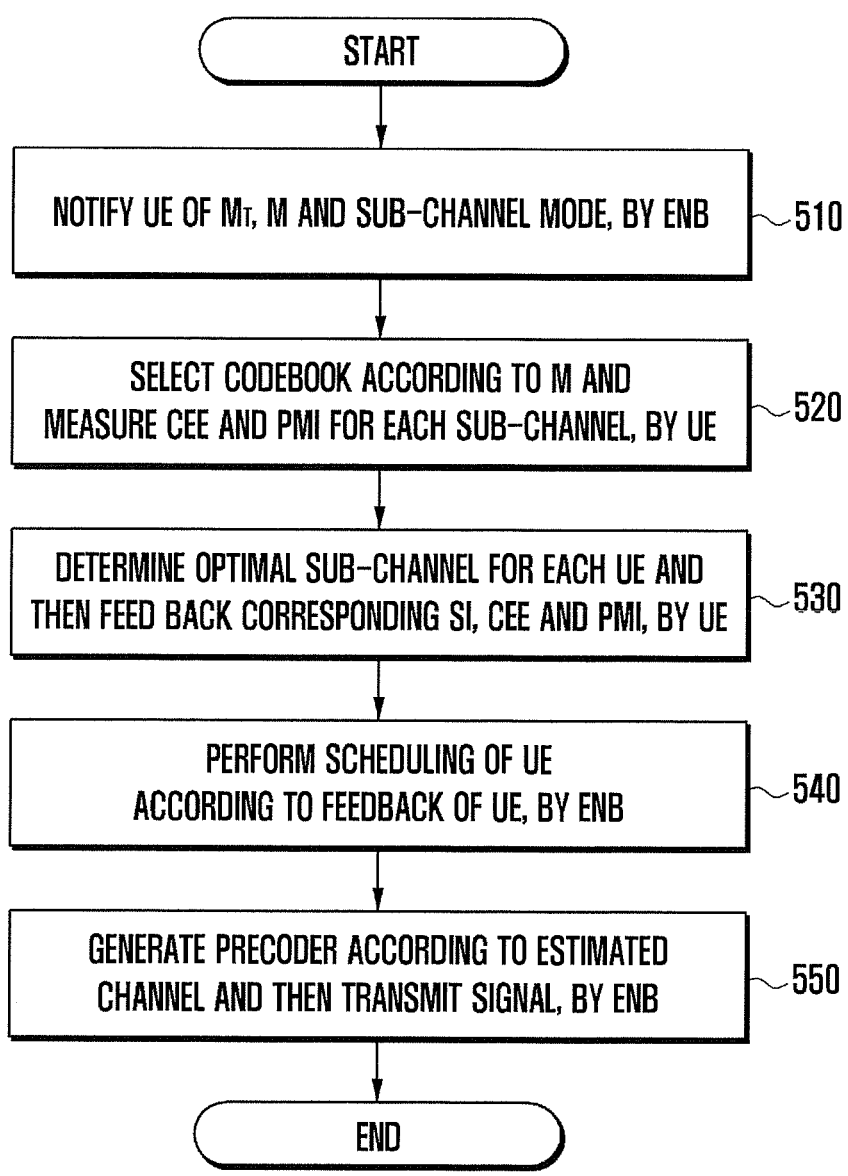
FIG. 5 illustrates a scheduling process according to an embodiment of the present disclosure.

FIG. 5 illustrates a scheduling process according to an embodiment of the present disclosure. In accordance with the embodiment, the eNB does not reconcile the SIs of the UEs with each other.

In operation 510, the eNB transmits the number $M_T$ of transmission antennas, the size m of sub-channels, and a sub-channel configuration mode, to the UE. Items, which are predetermined according to a standard scheme, among the number $M_T$ of the transmission antennas, the size m of the sub-channel, and the sub-channel configuration mode may not be transmitted.

In operation 520, the UE selects a proper codebook according to the size m of the sub-channel to determine an optimal PMI and a CEE for each of the sub-channels.

FIG. 6 illustrates a scheme by which a $k^{th}$ UE determines a CEE for each sub-channel and an optimal PMI when m is equal to 3. In an example of FIG. 6, for a sub-channel $h_k^{(1)}$, the CEE is 0.1, and the optimal PMI is $w_3^{(3)}$. Further, for a sub-channel $h_k^{(2)}$, the CEE is 0.2, and the optimal PMI is $w_2^{(3)}$.

In operation 530, the UE determines an optimal sub-channel for the corresponding UE, and transmits the SI, the CEE, and the PMI according to the determined sub-channel, to the eNB. Here, the UE may determine the sub-channel having the smallest CEE as an optimal sub-channel. When there are two or more sub-channels having the smallest CEE, one of the sub-channels may be arbitrarily selected. In a case of FIG. 6, when there are no sub-channels having the CEE lower than 0.1 among other sub-channels, the $k^{th}$ UE may select a sub-channel $h_k^{(1)}$ as an optimal sub-channel.

In operation 540, the eNB performs scheduling according to the feedback of the UE.

The eNB may perform mapping of sub-channel information according to the SI, the CEE, and the PMI of each of the UEs, which are fed back. Equation (12) is an example of the sub-channel information mapping according to the feedback in a system in which there are K UEs and S sub-channels, wherein K is equal to 4 and S is equal to 3.

$$\hat{H}_{eNB}_{[K \times S]} = \begin{bmatrix} \text{———} & \{0.2, w_2^{(3)}\} & \text{———} \\ \{0.1, w_3^{(3)}\} & & \\ & & \{0.3, w_3^{(3)}\} \\ \text{———} & \{0.15, w_1^{(3)}\} & \text{———} \end{bmatrix} \quad (12)$$
$$\quad s=1 \quad s=2 \quad s=3$$

In Equation (12), each row of the matrix denotes a UE, and each column of the matrix denotes an SI. A first UE estimates a sub-channel corresponding an SI 2 as an optimal sub-channel, estimates a CEE as 0.2, estimates a PMI as $w_2^{(3)}$, and notifies the eNB of these contents. Channel estimation results of other UEs may be similarly inferred.

The eNB may perform scheduling of the UE according to the fed back CEE. Equation (13) is an example of a CSIT $\tilde{H}$ which the eNB obtains in a case where $M_T$ is equal to 9, m is equal to 3, the number $K_S$ of UEs of which the scheduling is performed is equal to 2, and the sub-channel configuration mode is mode 1 (the exclusive mode) when receiving feedbacks according to Equation (12) from the UEs.

$$\tilde{H}_{eNB}_{[K_S \times M_T]} = \begin{bmatrix} w_{1,3} & w_{2,3} & w_{3,3} & 0 & 0 & 0 & 0 & 0 & 0 \\ 0 & 0 & 0 & w_{1,1} & w_{2,1} & w_{3,1} & 0 & 0 & 0 \end{bmatrix} \quad (13)$$

In Equation (13), each row of the matrix denotes a UE of which the scheduling is performed, and each column of the matrix denotes a PMI to be used in each antenna.

In operation 550, the eNB generates a precoder according to the estimated channel according to Equation (13), and transmits a signal according to the scheduling.

Figure 7:
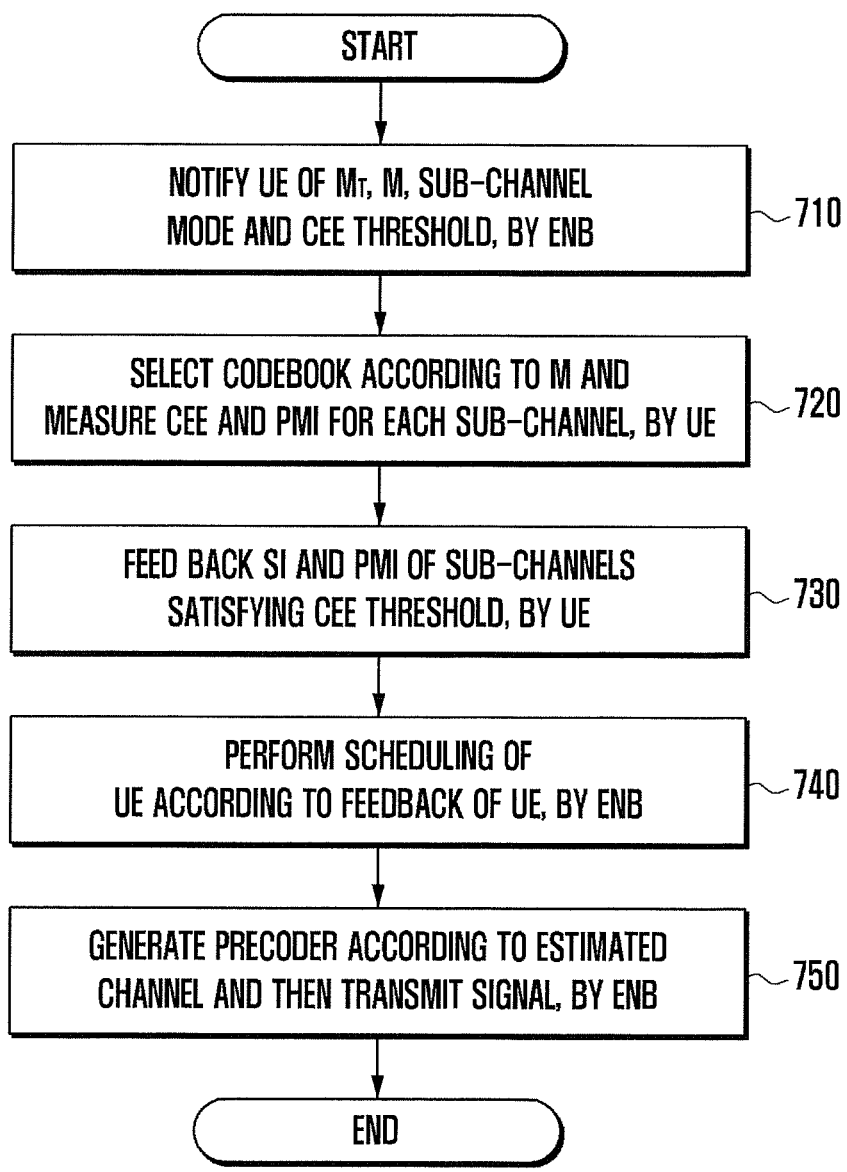
FIG. 7 illustrates a scheduling process according to an embodiment of the present disclosure.

FIG. 7 illustrates a scheduling process according to an embodiment of the present disclosure. In accordance with this embodiment, the eNB reconciles SIs, which each of UEs connected to the eNB uses, with each other.

In operation 710, the eNB transmits the number MT of transmission antennas, the size m of sub-channels, a sub-channel configuration mode, and a CEE threshold, to the UE. Items, which are predetermined according to a standard scheme, among the number MT of the transmission antennas, the size m of the sub-channel, the sub-channel configuration mode, the CEE threshold may not be transmitted.

In operation 720, the UE selects a proper codebook according to the size m of the sub-channel to determine an optimal PMI and a CEE for each of the sub-channels.

FIG. 8 illustrates a scheme by which a $k^{th}$ UE determines a CEE for each sub-channel and an optimal PMI when m is equal to 2. In an example of FIG. 8, for a sub-channel $h_k^{(1)}$, the CEE is 0.1, and the optimal PMI is $w_3$. Further, for a sub-channel $h_k^{(2)}$, the CEE is 0.2, and the optimal PMI is $w_2$.

In operation 730, the UE selects a sub-channel(s) which satisfies the CEE threshold, and feeds back a SI, a CEE and a PMI corresponding to the sub-channel(s).

In an example of FIG. 8, in a case of the sub-channel $h_k^{(1)}$, the CEE is equal to 0.1. In an embodiment, the CEE is lower than the CEE threshold equal to 0.15, such that an SI is displayed as 1 implying a reliable sub-channel. In a case of the sub-channel $h_k^{(2)}$, the CEE is equal to 0.2. In an embodiment, the CEE is higher than the CEE threshold, such that an SI is displayed as 0 implying an unreliable sub-channel. In this embodiment, the $k^{th}$ UE transmits the SI of the sub-channel $h_k^{(1)}$, and the PMI $w_3$ corresponding to the SI, to the eNB. The UE needs not to transmit the CEE corresponding to the SI together.

In operation 740, the eNB performs scheduling according to the feedback from the UE.

Equation (14) is an example of sub-channel information which the eNB can acquire when the size m of the sub-channel is equal to 4 and the number K of the UEs is equal to 4.

$$\hat{H}_{eNB}_{[K \times S]} = \begin{bmatrix} \{1, w_3^{(2)}\} & 0 & 0 & \{1, w_2^{(2)}\} \\ 0 & 0 & 0 & 0 \\ 0 & 0 & \{1, w_2^{(2)}\} & 0 \\ 0 & 0 & 0 & \{1, w_1^{(2)}\} \end{bmatrix} \quad (14)$$
$$s=1 \quad s=2 \quad s=3 \quad s=4$$

In Equation (14), each row corresponds to K UEs. In Equation (14), each column corresponds to S SIs. With reference to a first row of Equation (14), it can be seen that a first UE has CEEs satisfying the CEE threshold, with respect to sub-channels 1 and 4. It can be seen that a second UE does not have a sub-channel having a CEE satisfying the CEE threshold. Other rows may be construed similarly.

The eNB selects a sub-channel having a CEE satisfying the CEE threshold with respect to the largest number of UEs based on the acquired sub-channel information, so as to improve interference cancellation efficiency. Here, the sub-channel of which the number s is 4 satisfies the CEE threshold with respect to the two UEs, such that the eNB may select the sub-channel of which the number s is 4.

Equation (12) is converted into the CSIT according to Equation (15) when the number MT of antennas is equal to 8, the size m of the sub-channel is equal to 2, the number K of the UEs is equal to 4, and the sub-channel configuration mode is mode 1.

$$\tilde{H}_{eNB \atop [K \times M_T]} = \begin{bmatrix} w_{1,3} & w_{2,3} & 0 & 0 & 0 & 0 & w_{1,2} & w_{2,2} \\ 0 & 0 & 0 & 0 & 0 & 0 & 0 & 0 \\ 0 & 0 & 0 & 0 & w_{1,2} & w_{2,2} & 0 & 0 \\ 0 & 0 & 0 & 0 & 0 & 0 & w_{1,1} & w_{2,1} \end{bmatrix} \quad (15)$$

In Equation (15), each row of the matrix corresponds to the UE, and each column of the matrix corresponds to the antenna.

As described above, the eNB selects a fourth sub-channel, so as to configure an effective channel according to Equation (16).

$$\overline{H}_{[K_S \times m]} = \begin{bmatrix} w_{1,2} & w_{2,2} \\ w_{1,1} & w_{2,1} \end{bmatrix} \quad (16)$$

In Equation (16), each row corresponds to the UE (of which the total number is KS), and each column corresponds to the antenna of the selected sub-channel.

In operation 750, the eNB generates a precoder according to the estimated channel according to Equation (16), and transmits a signal according to the scheduling.

Figure 9:
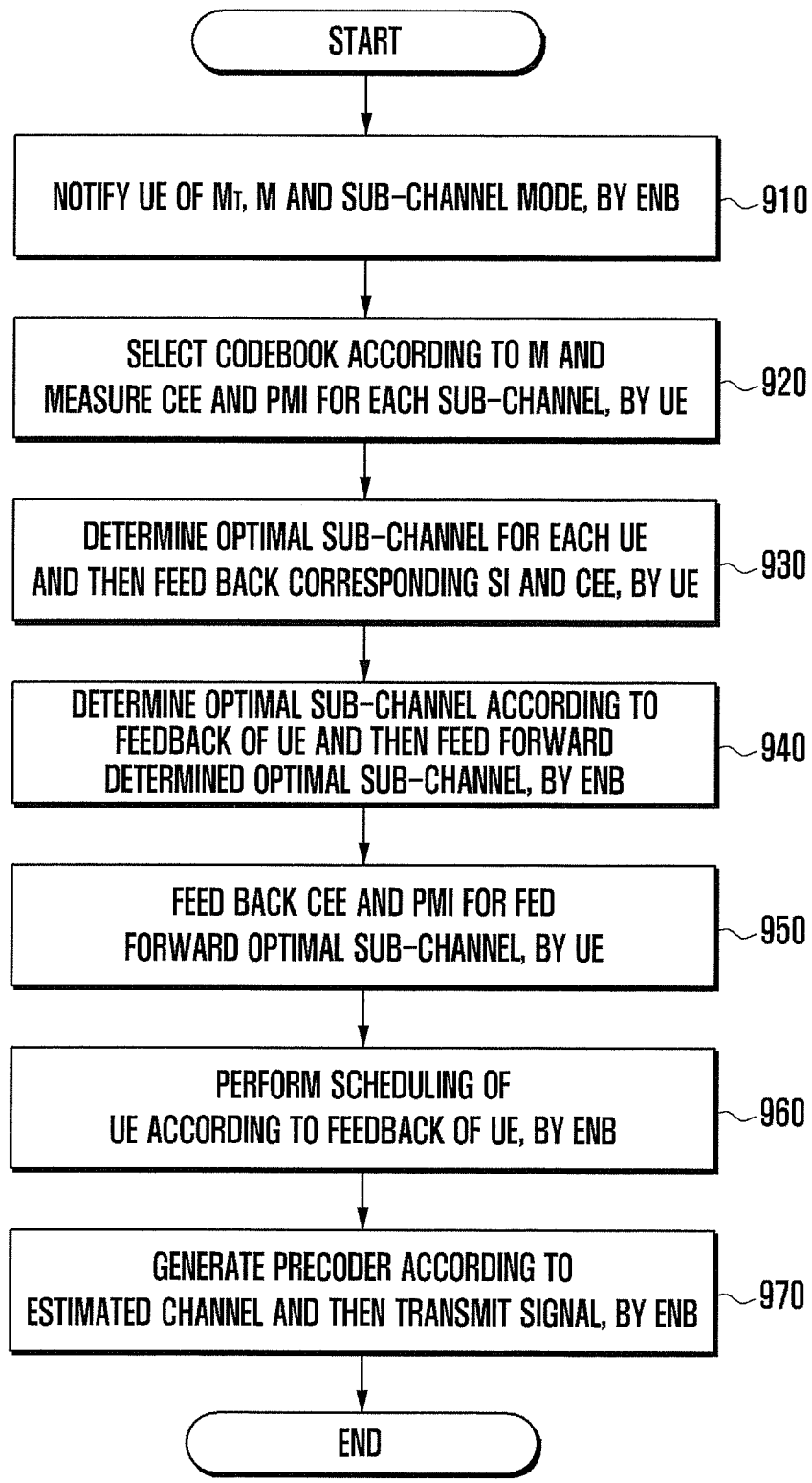
FIG. 9 illustrates a scheduling process according to an embodiment of the present disclosure.

FIG. 9 illustrates a scheduling process according to an embodiment of the present disclosure. In accordance with the embodiment, the eNB reconciles SIs, which each of UEs connected to the eNB uses, with each other.

In operation 910, the eNB notifies the UE of the number $M_T$ of the antennas, the size m of the sub-channel, and the sub-channel configuration mode. When one or more of the number MT of the antennas, the size m of the sub-channel, and the sub-channel configuration mode is predetermined according to a standard scheme, the predetermined items may not be transmitted.

In operation 920, the UE selects a proper codebook according to the size m of the sub-channel and determines an optimal PMI and a CEE for each of the sub-channels.

In operation 930, the UE determines an optimal sub-channel of the corresponding UE, and feeds back the SI and the CEE corresponding to the sub-channel, to the eNB. Here, the optimal sub-channel corresponds to a sub-channel having the smallest CEE. In this operation, the UE needs not to feed back an optimal PMI.

In operation 940, the eNB determines an optimal sub-channel of the corresponding eNB and transmits the optimal sub-channel to UEs. The eNB may perform mapping of sub-channel information according to the fed back CEE. Equation (17) is an example of the mapping of the sub-channel information according to the fed back CEE when the size m of the sub-channel is equal to 2, the number K of the UEs is equal to 4, and the number S of the sub-channels is equal to 3.

$$\hat{H}_{eNB \atop [K \times S]} = \begin{bmatrix} & \{0.2\} & \\ \{0.1\} & & \\ & & \{0.3\} \\ & \{0.15\} & \\ s=1 & s=2 & s=3 \end{bmatrix} \quad (17)$$

In the matrix of Equation (17), each row corresponds to each UE, and each column corresponds to each SI. Here, a CEE of an item corresponding to an SI 1 of a second UE is 0.1 and this value is the lowest. Thus, the eNB selects the SI corresponding to s equal to 1 as an optimal SI.

The eNB transmits the selected SI to UEs. In operation 950, the UE determines a CEE and an optimal PMI for the received SI (the optimal SI of the eNB), and transmits the CEE and the PMI to the eNB again.

In operation 960, the eNB performs scheduling of the UE based on the received CEE and the received PMI. The eNB may acquire CSIT for the corresponding SI according to Equation (18) based on the received CEE and the received PMI.

$$\tilde{H}_{eNB \atop [K \times M_T]} = \begin{bmatrix} \{0.3, w_3\} \\ \{0.1, w_3\} \\ \{0.4, w_1\} \\ \{0.3, w_2\} \end{bmatrix} \quad (18)$$

In Equation (18), each row of the matrix (or the vector) corresponds to each UE.

The number $K_S$ of the UEs to be scheduled is assumed to be 2. In this embodiment, the eNB may select a second UE (of which the CEE is equal to 0.1) and a fourth UE (of which the CEE is equal to 0.3), wherein the ordinal number is assigned in order from the UE having the smallest CEE for the selected SI. However, the UE which uses the same PMI as that of the selected UE is excluded from selection or subordinated. For example, the eNB first may select the second UE which has the smallest CEE in Equation (17), and may select a UE having the second lowest CEE. In an embodiment, both of CEEs of the first UE and the fourth UE are equal to 0.3. However, the PMI of the first UE is $w_3$ and the PMI of the fourth UE is $w_2$. Since $w_3$ among these is first used for the second UE, the eNB may exclude the first UE using $w_3$ from selection and select the fourth UE. Accordingly, the second UE and the fourth UE are finally selected as UEs to be scheduled.

Accordingly, the eNB generates an effective channel according to Equation (19).

$$\overline{H}_{[K_S \times m]} = \begin{bmatrix} w_{1,3} & w_{2,3} \\ w_{1,2} & w_{2,2} \end{bmatrix} \quad (19)$$

In Equation (19), each row corresponds to each UE to be scheduled, and each column corresponds to each antenna corresponding to the selected SI.

In operation 970, the eNB generates a proper precoder by using Equation (19) and transmits a signal, which is similar to some of the embodiments as shown above.

Figure 10:
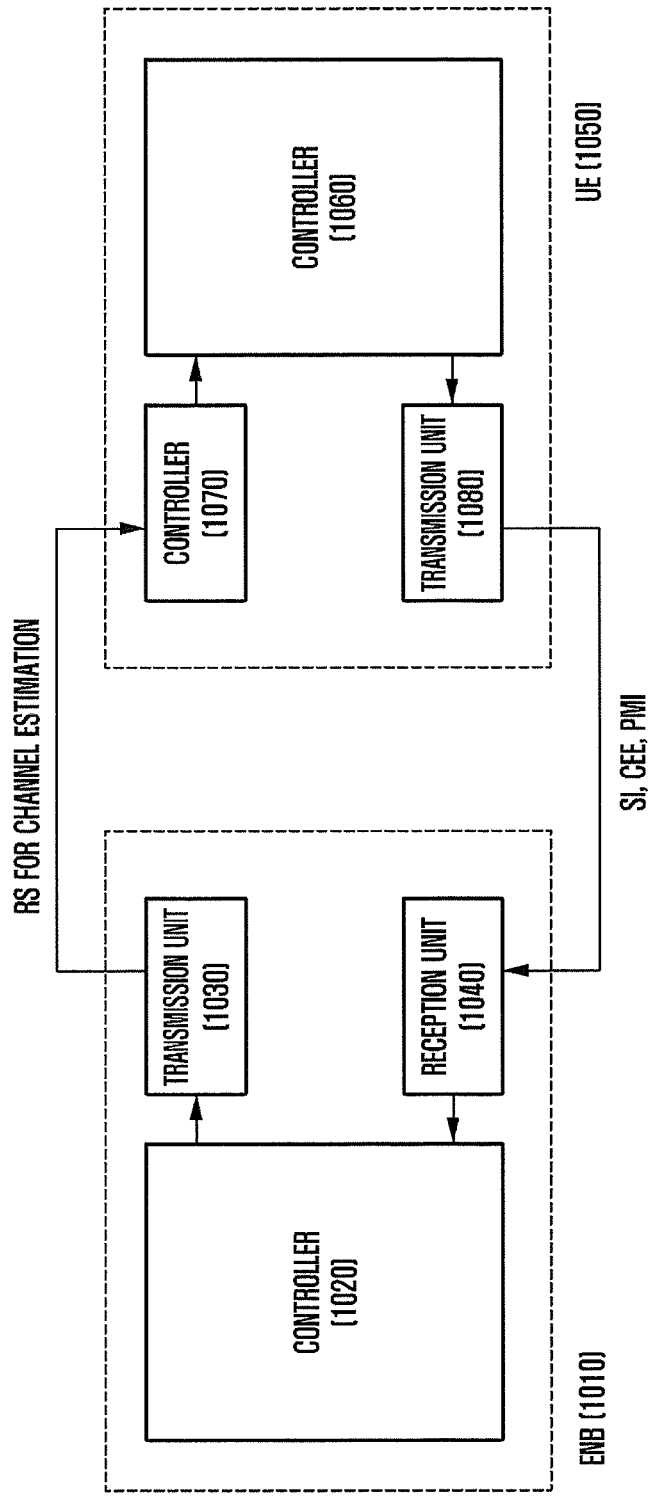
FIG. 10 illustrates a block diagram of a UE 1050 and an eNB 1010 according to an embodiment of the present disclosure.

FIG. 10 illustrates a block diagram of a UE 1050 and an eNB 1010 according to an embodiment of the present disclosure.

Referring to FIG. 10, an eNB 1010 according to an embodiment of the present disclosure includes a controller 1020, a transmission unit 1030 and a reception unit 1040. The transmission unit 1030 and the reception unit 1040 may collectively refer to communication units.

The controller 1020 controls each of components of the eNB 1010 to operate the eNB 1010 according to one or more of the aforementioned embodiments. The controller 1020 may select the SI and the UE to be scheduled and may perform the scheduling operation, especially according to different embodiments. Further, the controller 1020 may configure the sub-channel and perform other operations using the same, according to different embodiments. The transmission unit 1030 transmits a signal needed for operating according to one or more of the aforementioned embodiments. Especially, the transmission unit 1030 may transmit an RS such that a UE 1050 may perform channel estimation. The reception unit 1040 receives a signal needed for operating according to one or more of the aforementioned embodiments. Especially, the reception unit 1040 receives an SI optimal to the UE 1050 from the UE 1050. Further, the reception unit 1040 may receive at least a part of the CEE and the PMI corresponding to the corresponding SI, from the UE 1050.

The UE 1050 according to an embodiment of the present disclosure includes a controller 1060, a reception unit 1070 and a transmission unit 1080. The transmission unit 1080 and the reception unit 1070 may collectively refer to communication units.

The controller 1060 controls each of components of the UE 1050 to operate the UE 1050 according to one or more of the aforementioned embodiments. The controller 1060 may determine the PMI and the CEE optimal to the SI and may perform selection of the optimal SI, especially according to different embodiments. Further, the controller 1060 may configure the sub-channel and perform other operations using the same, according to different embodiments. The reception unit 1070 receives a signal needed for operating according to one or more of the aforementioned embodiments. Especially, the reception unit 1070 may receive an RS needed for the channel estimation. The transmission unit 1080 transmits a signal needed for operating according to one or more of the aforementioned embodiments. Especially, the transmission unit 1080 transmits an SI optimal to the UE 1050 to the eNB 1010. Further, the transmission unit 1080 may transmit at least a part of the CEE and the PMI corresponding to the corresponding SI, to the eNB 1010.

Although the other descriptions for FIG. 10 are not disclosed clearly, each of the components of FIG. 10 may perform an operation needed for any one of the embodiments of the present disclosure.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

Those skilled in the art can appreciate that it is possible to implement the present disclosure in another specific form without changing the technical idea or the indispensable characteristics of the present disclosure. Therefore, it should be understood that the above-described embodiments are illustrative and are not limiting under any possible interpretation. The scope of the present disclosure is defined by the appended claims to be described later, rather than the detailed description. Accordingly, it should be appreciated that all modifications or variations derived from the meaning and scope of the appended claims and their equivalents are included in the range of the present disclosure.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method to transmit channel related information using a user equipment (UE), the method comprising:

receiving information related to a sub-channel configuration from an evolved Node B (eNB);

receiving a reference signal from the eNB;

configuring a sub-channel corresponding to a part of a plurality of antennas of the eNB based on the information;

acquiring a channel estimation error (CEE) and a precoding matrix indicator (PMI) corresponding to the configured sub-channel using the reference signal by estimating a correlation between a channel state of the sub-channel and a codebook; and
transmitting a sub-channel indicator (SI) indicating a sub-channel that is selected based on the CEE.

2. The method of claim 1, wherein configuring the sub-channel comprises:
   acquiring a size of the sub-channel;
   configuring the sub-channel corresponding to the antennas corresponding to the size of the sub-channel among the antennas of the eNB; and
   configuring the sub-channel such that different sub-channels do not share different antennas with each other.

3. The method of claim 1, wherein transmitting the SI comprises transmitting an indication of an optimal sub-channel having the smallest CEE, a CEE corresponding to the optimal sub-channel, and a PMI corresponding to the optimal sub-channel.

4. The method of claim 1, wherein transmitting the SI comprises transmitting an indication of a sub-channel corresponding to a CEE larger than a threshold and a PMI corresponding to the sub-channel corresponding to the CEE larger than the threshold.

5. The method of claim 1, wherein transmitting the SI comprises:
   transmitting an indication of an optimal sub-channel having the smallest CEE and a CEE corresponding to the optimal sub-channel; and
   the method further comprises receiving an SI selected by the eNB, and transmitting a CEE and a PMI that corresponds to the SI selected by the eNB.

6. A user equipment (UE) to transmit channel related information, the UE comprising:
   a transceiver configured to:
      receive information on a sub-channel configuration from an evolved Node B (eNB) and a reference signal from the eNB, and
      transmit a sub-channel indicator (SI) indicating a sub-channel that is selected based on a channel estimation error (CEE); and
   a controller configured to configure the sub-channel corresponding to a part of a plurality of antennas of the eNB, and acquires the CEE and a precoding matrix indicator (PMI) that correspond to the configured sub-channel using the reference signal by estimating a correlation between a channel state of the sub-channel and a codebook.

7. The UE of claim 6, wherein the controller is configured to acquire a size of the sub-channel, configure the sub-channel corresponding to the antennas corresponding to the size of the sub-channel among the antennas of the eNB, and configure the sub-channel such that different sub-channels do not share different antennas with each other.

8. The UE of claim 6, wherein the transceiver is configured to transmit the SI indicating an optimal sub-channel having the smallest CEE, a CEE corresponding to the optimal sub-channel, and a PMI corresponding to the optimal sub-channel.

9. The UE of claim 6, wherein the transceiver is configured to transmit an SI indicating a sub-channel corresponding to a CEE larger than a threshold and a PMI corresponding to the sub-channel corresponding to the CEE larger than the threshold.

10. The UE of claim 6, wherein the transceiver is configured to transmit the SI indicating an optimal sub-channel having the smallest CEE and a CEE corresponding to the optimal sub-channel, receive an SI selected by the eNB, and transmit a CEE and a PMI that corresponds to the SI selected by the eNB.

* * * * *